Patented Oct. 7, 1941

UNITED STATES PATENT OFFICE 2,258,551

PROCESS FOR THE MANUFACTURE OF 1-AMINO - 4 - (4'-HYDROXY)-PHENYLAMINO ANTHRAQUINONES

Paul Grossmann, Binningen, Switzerland, assignor to the firm Society of Chemical Industry in Basle, Basel, Switzerland No Drawing. Application November 24, 1939, Serial No. 306,033. In Switzerland November 29, 1938

4 Claims. (Cl. 260—380)

It has been found that 1-amino-4-(4'-hydroxy)-phenyl-amino anthraquinones of the general formula

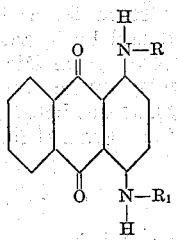

in which R signifies hydrogen or an alkyl, cycloalkyl, aralkyl, or aryl radical and $R_1$ denotes an aromatic nucleus of the benzene series substituted by an OH-group in the 4-position, are obtained in a very simple manner and in a pure state if products of the general formula

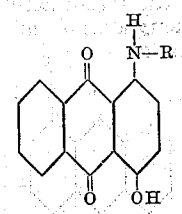

in which R has the meaning given above are allowed to react with 1-amino-4-hydroxybenzenes in the presence of boric acid, if required in the form of its anhydride, and a diluent selected from the group consisting of cyclic alcohols, cyclic tertiary bases and phenols, such as cyclohexanol, pyridine, dimethylaniline, phenols—this term including cresols—and similar products, at temperatures lying between 80° and 200° C., preferably at temperatures between 100° and 150° C.

The success of this method of working, which is of great techincal importance, is surprising, on account of the fact that the 1-amino-4-hydroxybenzenes, in contrast to other aromatic amines, such as aniline, para-toluidine, para-chloraniline, etc., do not react smoothly according to the methods usually adapted for the introduction of phenylamino groups into the alpha position of the anthraquinone nucleus, for example, by heating the bases with α-halogenanthraquinones or with α-methoxyanthraquinones. Also, other valuable methods, as, for example, the condensation of leuco-1:4-diaminoanthraquinones with 1 mol of a 1-amino-4-hydroxybenzene, do not give very satisfactory results as regards yield and purity of the reaction product.

Furthermore, the smooth working of the reaction was not to be foreseen, since other aromatic amines, such as, for example, 1-amino-3-hydroxybenzenes, will not permit of condensation by the present process.

The products obtained by means of the present process are partly new. They form valuable dyestuffs for acetate rayon or, on the other hand, valuable intermediate products. Acid wool dyestuffs are obtained by the introduction of sulphonic acid groups into the products.

Example 1

12 parts of dried boric acid and 14 parts of 1-amino-4-hydroxybenzene are mixed into 40 parts of cyclohexanol, and then 24 parts of 1-amino-4-hydroxy-anthraquinone are added while stirring at 120° C. The mixture is heated at 120° C. for about 5 hours with further stirring and is then allowed to cool to about 70° C., when 60 parts of methyl alcohol are added: the whole is then cooled to room temperature and filtered. The filtration residue is washed out with methyl alcohol and water, and the 1-amino-4-(4'-hydroxy)-phenylamino-anthraquinone formed is obtained in very good yield. Dried boric acid may be replaced by boric acid which has been rendered anhydrous by melting. The reaction may also be carried out at a higher temperature, further, for example, even at the boiling point of the cyclohexanol.

An analogous procedure is adopted with other products of the general formula

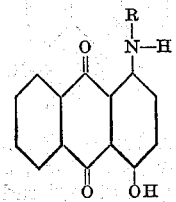

such as 1-methylamino-, 1-β-hydroxyethylamino-, 1-butylamino-, 1-cyclohexylamino-, or 1-benzylamino-4-hydroxyanthraquinone.

Example 2

120 parts of 1-amino-4-hydroxyanthraquinone, together with 125 parts of para-aminophenol and 18 parts of boric acid which has been dehydrated by melting are heated in 250 parts of crude cresol for 2 hours at 120° C. with stirring. The mixture is then cooled down to about 95° C., and a lukewarm mixture consisting of 300 parts caustic soda of 40% strength, 500 parts of water and 125 parts of sodium bisulphite solution of 40% strength is added to the melt with further stirring. This mixture is then cooled down to about 25° C., and the dyestuff, which has crystallized in beautiful needles is filtered off and washed with water until the wash-water is seen to be colourless. The 1-amino-4-(4'-hydroxy)-phenylaminoanthraquinone obtained is very pure.

By raising the temperature of reaction, for example, to 180° C., the period of reaction may be shortened. The use of a temperature which is too high may, however, prove disadvantageous as regards the purity of the end product.

Example 3

15.7 parts of 1-hydroxy-4-phenylaminoanthraquinone, together with 4 parts of dried boric acid and 8 parts of 1-amino-4-hydroxybenzene, are heated in 30 parts of cyclohexanol at 150° C. with stirring until the colour of the solution no longer continues to turn greener. When this point is reached, the mixture is allowed to cool down to 70° C., 60 parts of ethyl alcohol are added and the whole is filtered and the residue is washed with ethyl alcohol and water. 1-phenyl-amino-4-(4'-hydroxy)-phenylaminoanthraquinone is obtained in good yield and a good state of purity.

In an analogous manner, compounds such as 1-(3'-methyl)-phenylamino-4-(4''-hydroxy)-phenylaminoanthraquinone, 1-(2'-methoxy)-phenylamino-4-(4''-hydroxy)-phenylaminoanthraquinone or 1-(4'-amino)-phenylamino-4-(4''-hydroxy)-phenylaminoanthraquinone or 1-(3'-hydroxy)-phenylamino-4-(4''-hydroxy)-phenylaminoanthraquinone may be obtained from N-arylated 1-amino-4-hydroxyanthraquinones.

Here also boric acid anhydride may be used in place of boric acid: cyclohexanol may be replaced by pyridine, dimethylaniline, phenols, such as phenol itself or cresols. It may also prove preferable to work in closed vessels.

What I claim is:

1. Process for the manufacture of 1-amino-4-(4'-hydroxy)-phenylamino anthraquinones of the general formula

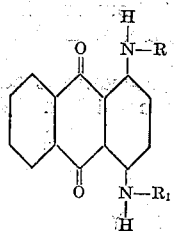

wherein R stands for a member of the group consisting of hydrogen atoms, alkyl- and cycloalkyl-, and aralkyl- and aryl radicals of the benzene series, and R₁ means an aromatic nucleus of the benzene series substituted by an OH-group in the 4-position, comprising causing 1-amino-4-hydroxybenzenes to react in presence of a condensing agent selected from the group consisting of boric acid and boric acid anhydride, and of a diluent selected from the group consisting of cyclic alcohols, cyclic tertiary bases and phenols, at temperatures between 80 and 200° C., with products of the general formula

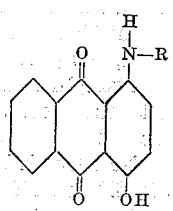

wherein R has the above identified meaning.

2. Process for the manufacture of 1-amino-4-(4'-hydroxy)-phenylamino anthraquinones of the general formula

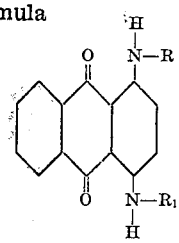

wherein R stands for a member of the group consisting of hydrogen atoms, alkyl- and cycloalkyl-, and aralkyl- and aryl radicals of the benzene series, and R₁ means an aromatic nucleus of the benzene series substituted by an OH-group in the 4-position, comprising causing 1-amino-4-hydroxybenzene to react in presence of a condensing agent selected from the group consisting of boric acid and boric acid anhydride, and of a diluent selected from the group consisting of cyclic alcohols, cyclic tertiary bases and phenols, at temperatures between 80 and 200° C., with products of the general formula

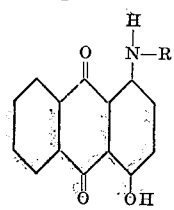

wherein R has the above identified meaning.

3. Process for the manufacture of 1-amino-4-(4'-hydroxy)-phenylamino anthraquinones of the general formula

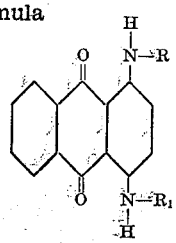

wherein R stands for a member of the group consisting of hydrogen atoms, alkyl- and cycloalkyl-, and aralkyl- and aryl radicals of the benzene series, and R₁ means an aromatic nucleus of the benzene series substituted by an OH-group in the 4-position, comprising causing 1-amino-4-hydroxybenzene to react in presence of a condensing agent selected from the group consisting of boric acid and boric acid anhydride, and of a phenol as diluent, at temperatures between 80 and 200° C., with products of the general formula

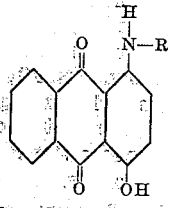

wherein R has the above identified meaning.

4. Process for the manufacture of 1-amino-4-(4'-hydroxy)-phenylamino anthraquinone, comprising causing 1-amino-4-hydroxybenzene to react in the presence of boric acid anhydride and phenols, at temperatures above 80° C. but not exceeding 180° C., on 1-amino-4-hydroxyanthraquinone.

PAUL GROSSMANN.

DISCLAIMER 2,258,551.—*Paul Grossmann*, Binningen, Switzerland. PROCESS FOR THE MANUFACTURE OF 1-AMINO-4-(4'-HYDROXY)-PHENYLAMINO ANTHRAQUINONES. Patent dated October 7, 1941. Disclaimer filed May 26, 1942, by the assignee, *Society of Chemical Industry in Basle*.

Hereby disclaims alkyl, cycloalkyl and aralkyl radicals from the scope of the definition of R in the first paragraph of the specification of the said patent;

Hereby disclaims the subject matter of the last paragraph of Example 1 of the said patent; and Hereby disclaims from the scope of each of claims 1, 2, and 3 all compounds corresponding to the formulae of the said claims wherein an R is an alkyl, cycloalkyl or aralkyl radical.

[*Official Gazette June 23, 1942.*]